United States Patent
Bauer et al.

(10) Patent No.: US 6,433,913 B1
(45) Date of Patent: *Aug. 13, 2002

(54) ELECTRO-OPTIC DEVICE INCORPORATING A DISCRETE PHOTOVOLTAIC DEVICE AND METHOD AND APPARATUS FOR MAKING SAME

(75) Inventors: Frederick T. Bauer; Harlan J. Byker, both of Holland; David J. Cammenga, Zeeland; Thomas F. Guarr, Holland; David L. Poll, Holland; William L. Tonar, Holland; Scott W. Vander Zwaag, Holland, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,075

(22) Filed: Dec. 22, 1999

Related U.S. Application Data

(60) Continuation-in-part of application No. 09/012,957, filed on Jan. 26, 1998, now Pat. No. 6,045,643, which is a division of application No. 08/616,698, filed on Mar. 15, 1996, now Pat. No. 5,805,330.

(51) Int. Cl.[7] ............................. G02F 1/15; B32B 17/00

(52) U.S. Cl. ....................................... 359/265; 156/107

(58) Field of Search ........................... 369/265; 385/14, 385/257; 428/317.1, 192, 463; 156/107

(56) References Cited

U.S. PATENT DOCUMENTS

| | | |
|---|---|---|
| 3,886,013 A | 5/1975 | Bowser |
| 3,940,898 A | 3/1976 | Kaufman |
| 3,990,201 A | 11/1976 | Falbel |
| 4,341,576 A | 7/1982 | Lewis |
| 4,445,953 A | 5/1984 | Hawk |
| 4,708,762 A | 11/1987 | Lenhardt |
| 4,826,547 A | 5/1989 | Lenhardt |
| 4,835,926 A | 6/1989 | King |
| 4,902,108 A | 2/1990 | Byker |
| 4,911,779 A | 3/1990 | Lenhardt |
| 4,942,704 A | 7/1990 | King |
| 4,947,604 A | 8/1990 | Sylvester |
| 5,017,252 A | 5/1991 | Aldrich et al. |
| 5,167,756 A | 12/1992 | Lenhardt |
| 5,268,049 A | 12/1993 | Marriott et al. |
| 5,350,469 A | 9/1994 | Lenhardt et al. |
| 5,351,151 A | 9/1994 | Levy |
| 5,366,574 A | 11/1994 | Lenhardt et al. |
| 5,377,037 A | 12/1994 | Branz et al. |
| 5,384,653 A | 1/1995 | Benson et al. |
| 5,442,478 A | 8/1995 | Lampert et al. |
| 5,457,564 A * | 10/1995 | Leventis et al. ............ 359/271 |

(List continued on next page.)

OTHER PUBLICATIONS

IBM Technical Disclosure Bulletin vol. 17, No. 9, Feb. 1975.

Design Goals and Challenges for a Photovoltaic–Powered Electrochromic Window Covering D.K. Benson et al.

*Primary Examiner*—Georgia Epps
*Assistant Examiner*—Omar Hindi
(74) *Attorney, Agent, or Firm*—Malcolm R. McKinnon; Brian J. Rees

(57) ABSTRACT

Improved electro-optic devices are provided which may be in the configuration of variable transmittance windows, variable transmittance eyeglasses, variable transmittance light filters and displays and other devices wherein the transmittance of light therethrough automatically varies as a function of light impinging thereon. The electro-optic devices include a self-erasing electro-optic medium, and the transmittance of light through such medium varies as a function of electrical signals applied thereto through the agency of at least one photovoltaic cell, enclosed within the electro-optic device, and obviating the necessity of providing external drive voltage or external bleeder resistors or external wiring. In addition, a method and apparatus are provided for making such electro-optic devices.

44 Claims, 4 Drawing Sheets

U.S. PATENT DOCUMENTS

| | | | |
|---|---|---|---|
| 5,487,937 A | * 1/1996 | Newby | .................... 428/317.1 |
| 5,790,298 A | 8/1998 | Tonar | |
| 5,805,330 A | 9/1998 | Byker et al. | |
| 6,045,643 A | * 4/2000 | Byker et al. | ................ 156/102 |

* cited by examiner

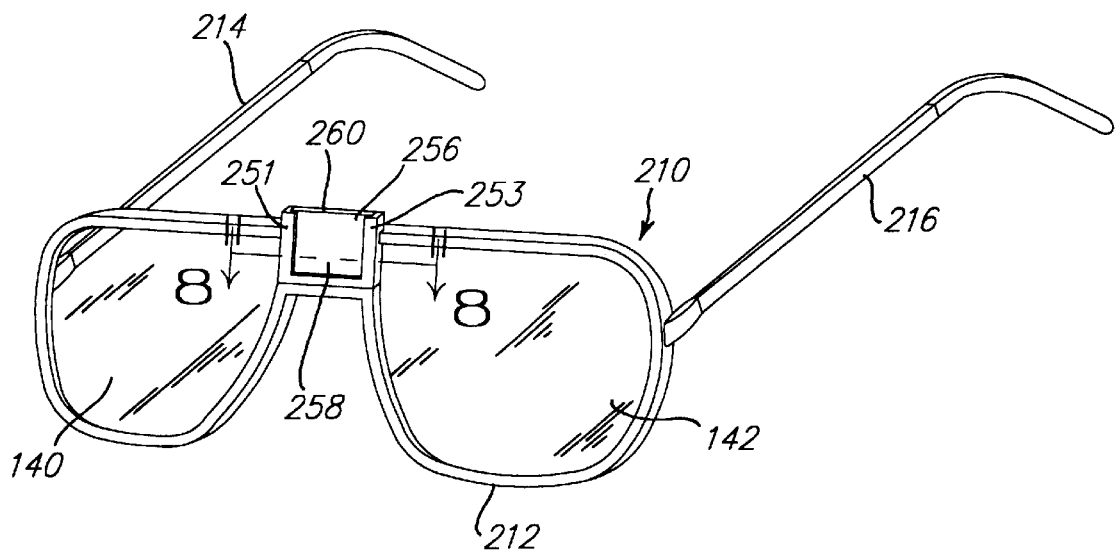
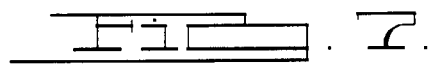
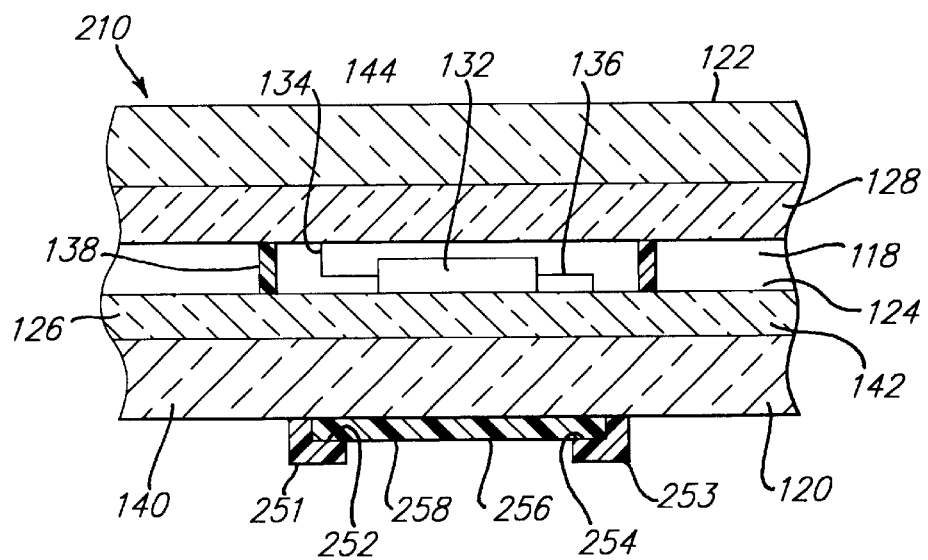

ELECTRO-OPTIC DEVICE INCORPORATING A DISCRETE PHOTOVOLTAIC DEVICE AND METHOD AND APPARATUS FOR MAKING SAME

This application is a continuation-in-part of application Ser. No. 09/012,957, U.S. Pat. No. 6,045,643, filed Jan. 26, 1998, which is a division of application Ser. No. 08/616,698, filed Mar. 15, 1996, issued as U.S. Pat. No. 5,805,330, dated Sep. 8, 1998.

BACKGROUND OF THE INVENTION

The present invention relates to electro-optic devices and, more particularly, to electro-optic devices having enclosed therein at least one photovoltaic device.

Heretofore, devices of reversibly variable transmittance to electromagnetic radiation have been proposed for such applications as the variable transmittance element in variable transmittance light-filters, variable transmittance eyeglasses, variable reflectance mirrors; and display devices which employ such light-filters or mirrors in conveying information. These variable transmittance light filters have included windows. Among such devices are those where the transmittance is varied by thermochromic, photochromic, or electro-optic (e.g., liquid crystal, dipolar suspension, electrophoretic, electrochromic, etc.) means and where the variable transmittance characteristic affects electromagnetic radiation that is at least partly in the visible spectrum (wavelengths from about 3800 Å to about 7600 Å). Typically, proposed control schemes for variable transmittance windows either allow the windows to be power controlled window-by-window with a person determining when the window should darken or have all windows controlled by a central computerized power source such that the window is darkened when the sun shines on them or on a sensor placed on a particular side of a building.

Devices of reversibly variable transmittance to electromagnetic radiation, wherein the transmittance is altered by electrochromic means are described, for example, by Chang, "Electrochromic and Electrochemichromic Materials and Phenomena," in Non-emissive Electrooptic Displays, A. Kmetz and K. von Willisen, eds. Plenum Press, New York, N.Y., pp. 155–196 (1976) and in various parts of Eletrochromism, P. M. S. Monk, R. J. Mortimer, D. R. Rosseinsky, VCH Publishers, Inc., New York, N.Y. (1995). Numerous electrochromic devices are known in the art. See, e.g., Manos, U.S. Pat. No. 3,451,741; Bredfeldt et al., U.S. Pat. No. 4,090,358; Clecak et al., U.S. Pat. No. 4,139,276; Kissa et al., U.S. Pat. No. 3,453,038; Rogers, U.S. Pat. Nos. 3,652,149, 3,774,988 and 3,873,185; and Jones et al., U.S. Pat. Nos. 3,282,157, 3,282,158, 3,282,160 and 3,283,656.

In addition to these devices there are commercially available electro-optic devices and associated circuitry, such as those disclosed in U.S. Pat. No. 4,902,108, entitled "Single-Compartment, Self-Erasing, Solution-Phase Electro-optic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 5, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al. Each of these patents is commonly assigned with the present invention and the disclosures of each, including the references contained therein, are hereby incorporated herein in their entirety by reference.

Photoelectrochromism is discussed generally in pages 192–197 of Electrochromism, P. M. S. Monk, R. J. Mortimer, D. R. Rosseinsky, VCH Publishers, Inc., New York, N.Y. (1995). Specifically, section 12.2.3, entitled "Cells Containing Photovoltaic Materials", discusses how a photovoltaic material produces a potential when illuminated and where the photovoltaic material has an internal rectifying field which provides a driving force for the electrons. This section goes on to describe that the voltage created by the photovoltaic material is insufficient, by itself, to darken the electrochromic material. Therefore the electrochromic cell incorporating a photovoltaic material needs an external bias applied which is supplemented by the small photovoltaic-voltage to cause electron transfer to proceed, i.e., have the electrochromic material darken.

Heretofore, various other electrochromic devices have been devised wherein the transmission of light therethrough or reflected thereby automatically varies as a function of light impinging thereon. For example: U.S. Pat. No. 5,377,037, entitled "Electrochromic-Photovoltaic Film for Light-Sensitive control of Optical Transmittance" to H. M. Branz et al. teaches a variable transmittance optical component which includes a solar cell-type photovoltaic device. The photovoltaic material is deposited over the entire surface of a transparent electrically conductive layer section. The photovoltaic material includes a p-type hydrogenated silicon carbide section, an undoped hydrogenated silicon carbide section, and phosphorous-doped hydrogenated silicon carbide section. A standard solid-state electrochromic multi-layer structure is then deposited over the layer of photovoltaic material such that the light traveling through the optical transmitter must travel through the photovoltaic material and through the electrochromic material. The photovoltaic material will absorb some portion of the light and will also create sufficient current to darken the electrochromic material. Solid-state electrochromic devices with good memory, once darkened, will not clear or bleach quickly without an external method of closing the electrochemical circuit, i.e., the device will not clear in a reasonable time even though the "darkening potential" is removed. The device taught by Branz et al. attempts to overcome this significant limitation by connecting a bleeder resistor to the two transparent conductive electrode layers to provide the electric potential and circuit across the device (to slowly bleach the device). In operation, the photovoltaic device produces a DC current which is applied between the transparent conductive layers and across the bleeder resistor. However, it takes a light source with the intensity of 1–2 suns to produce a transmission drop of only 10 percent, in approximately 12–13 minutes. Thus, incorporating a bleeder resistor complicates the circuitry required for the window system and also draws some power that otherwise could be used in darkening.

U.S. Pat. No. 5,348,653, entitled "Stand-Alone Photovoltaic (PV) Powered Electrochromic Window" to D. K. Benson et al. teaches a variable transmittance double pane window including a five-layer solid state electrochromic portion, an array of photovoltaic cells with a n-type conductivity region on the front side of a p-type silicon substrate, and an external switch-containing circuit. The photovoltaic cells are deposited directly on the glass and not on the transparent electrode. The photovoltaic cells and the battery circuit are connected in parallel to the electrochromic portion of the device. This allows selective activation of the electrochromic portion to either a substantially opaque state or a substantially transparent state by switching the external switch-containing circuit between having the photovoltaic devices drive the device to a dark state, or to a transparent state or having the battery device drive the device to a transparent state when the conditions are such that the incident sunlight is not sufficient for the photovoltaic array to produce the required energy. Again, solid-state electrochromic devices with good memory, once darkened, will not clear in a reasonable amount of time absent some method of closing the circuit, typically by applying a bleaching potential.

U.S. Pat. No. 5,457,564, entitled "Complementary Surface Confined Polymer Electrochromic Materials, Systems, and Methods of Fabrication Therefore" to Leventis et al. teaches an electrochromic device having polypyrrole-prussian blue composite material on the oxidatively coloring electrode and a heteroaromatic substance with at least one quaternized nitrogen on the reductively coloring electrode. Preferably, either the oxidative or reductive polymer is electro-deposited onto a metallic oxide to increase the cycle life of the device to an acceptable level. Leventis et al. also teaches using an external photovoltaic cell to generate power to darken the electrochromic device. The photovoltaic cells operate as forward biased diodes and allow current to flow in the opposite or "reverse" direction. Further, Leventis et al. places the photovoltaic cells behind the electrochromic device such that the light which drives them must first travel through the electrochromic material. As the degree of colorization of the device increases, the intensity of light impinging on the photovoltaic cells decreases and the output from the photovoltaic cells decreases, creating a limit of how much light the device can block.

When retrofitting electro-optic devices in the configuration of windows it is disadvantageous to have to run wires to each window to supply the external bias. Furthermore, even when installing electrochromic windows into a new building it would be easier and less expensive if no wires were needed to supply an external bias or no external circuits were necessary to help control colorization or bleaching of the window. Consequently, it is desirable to provide an improved electro-optic device having an improved photovoltaic drive mechanism.

OBJECTS OF THE INVENTION

Accordingly, a primary object of the present invention is to provide an improved electro-optic device having a discrete photovoltaic device integrally combined with the electro-optic device where no external drive voltage is needed, no bleaching circuit is required, and no external wiring is necessary.

Another object of the present invention is to overcome disadvantages in prior electro-optic devices of the indicated character and to provide improved electro-optic devices wherein the transmittance of light therethrough automatically varies as a function of light impinging thereon.

Another object of the present invention is to provide improved electro-optic devices which may be in the configuration of windows and eyeglasses which darken and clear uniformly in an aesthetically pleasing manner.

Another object of the present invention is to provide improved windows and eyeglasses which incorporate improved means for adjusting the amount of light that is transmitted therethrough to a desired and comfortable level.

Another object of the present invention is to provide improved self-erasing electro-optic devices that are economical to manufacture, durable, efficient and reliable in operation.

Another object of the present invention is to provide improved electro-optic devices wherein excellent speed of light transmissive change, good uniformity of light change across the entire surface area thereof, and continually variable light transmissive characteristics are obtained throughout the range of light transmittance of the devices.

SUMMARY OF THE INVENTION

The above and other objects, which will become apparent from the specification as a whole, including the drawings, are accomplished in accordance with one embodiment of the present invention by enclosing within an electro-optic device a discrete photovoltaic assembly which is capable of driving the electro-optic medium. The electro-optic device has front and back spaced-apart glass elements sealably bonded together defining a chamber filled with an electro-optic material. The front glass element has a transparent conductive layer on the face confronting the rear glass element and the rear glass element has a transparent conductive layer on the face confronting the front glass element. The seal is generally disposed some small distance from the perimeter of three edges of both glass elements and some greater distance in from the remaining (fourth) edge. The photovoltaic assembly is placed between the two glass elements on the outer perimeter along this fourth edge with the photon-absorbing (active) side of all the photovoltaic cells within the photovoltaic assembly facing in one direction. Alternately, the photovoltaic assembly or an array of assemblies may be placed in a sealed off region or regions any place within the window area and may even be in the form of a decorative design, such as a diamond, circle, and the like, and may assist in providing and maintaining the spacing between the transparent conductor-coated glass elements. The photovoltaic assembly is electrically connected to the two transparent conductive layers and when light impinges on the photovoltaic cell an electrical potential is generated which darkens the electro-optic material in proportion to the amount or intensity of impinging light. By choosing the relative area of the photovoltaic assembly to produce the correct current for the electro-optically active window area, the amount of darkening of the electro-optic portion can be directly and accurately controlled without the need for any circuit, wires or shorting resistors.

In addition, an apparatus for making an electro-optic window having two members capable of securing and holding two glass elements in a spaced-apart and parallel relationship is provided. The glass elements may be secured by vacuum-applying members or simple clips. The glass elements may be held in a spaced-apart and parallel relationship by a hydraulic mechanism or by simple spacers placed between the securing members.

In accordance with another embodiment of the present invention, electrochromic eyeglasses are provided wherein the transmission of light therethrough automatically varies as a function of light impinging thereon. Eyeglasses embodying the present invention include left and right lenses which are integrally mechanically and electrically connected together as a unitary structure. The lenses have front and rear spaced glass or plastic lens elements with a chamber disposed therebetween, the front and rear lens elements being transparent. One side of the front element confronting the rear element includes transparent electrically conductive means, and one side of the rear element confronting the front element also includes transparent electrically conductive means. The chamber disposed between the front and rear elements contains an electrochromic reversibly variable transmittance medium in contact with the transparent electrically conductive means on the front and rear elements. A photovoltaic cell is provided for applying electrical potential to the electrochromic medium to cause variations in the light transmittance of the electrochromic medium, the photovoltaic cell being disposed between the right and left lens portions of the eyeglasses. The photovoltaic cell is electrically connected to the two transparent electrically conductive layers so that when light impinges on the photovoltaic cell an electrical potential is generated which causes the electrochromic material to darken in proportion to the amount or intensity of light impinging thereon. By controlling the relative area of the photovoltaic assembly to produce the desired electrical current for the electro-optically active lens area, the amount of darkening of the electrochromic material may be directly and accurately controlled without the need for external electrical wiring, batteries or bleeder resistors.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 7 is a perspective view of another embodiment of the invention; and

FIG. 8 is a simplified, enlarged cross-sectional view of the electro-optic device illustrated in FIG. 7, taken on the line 8—8 thereof.

DETAILED DESCRIPTION

Figure 1:
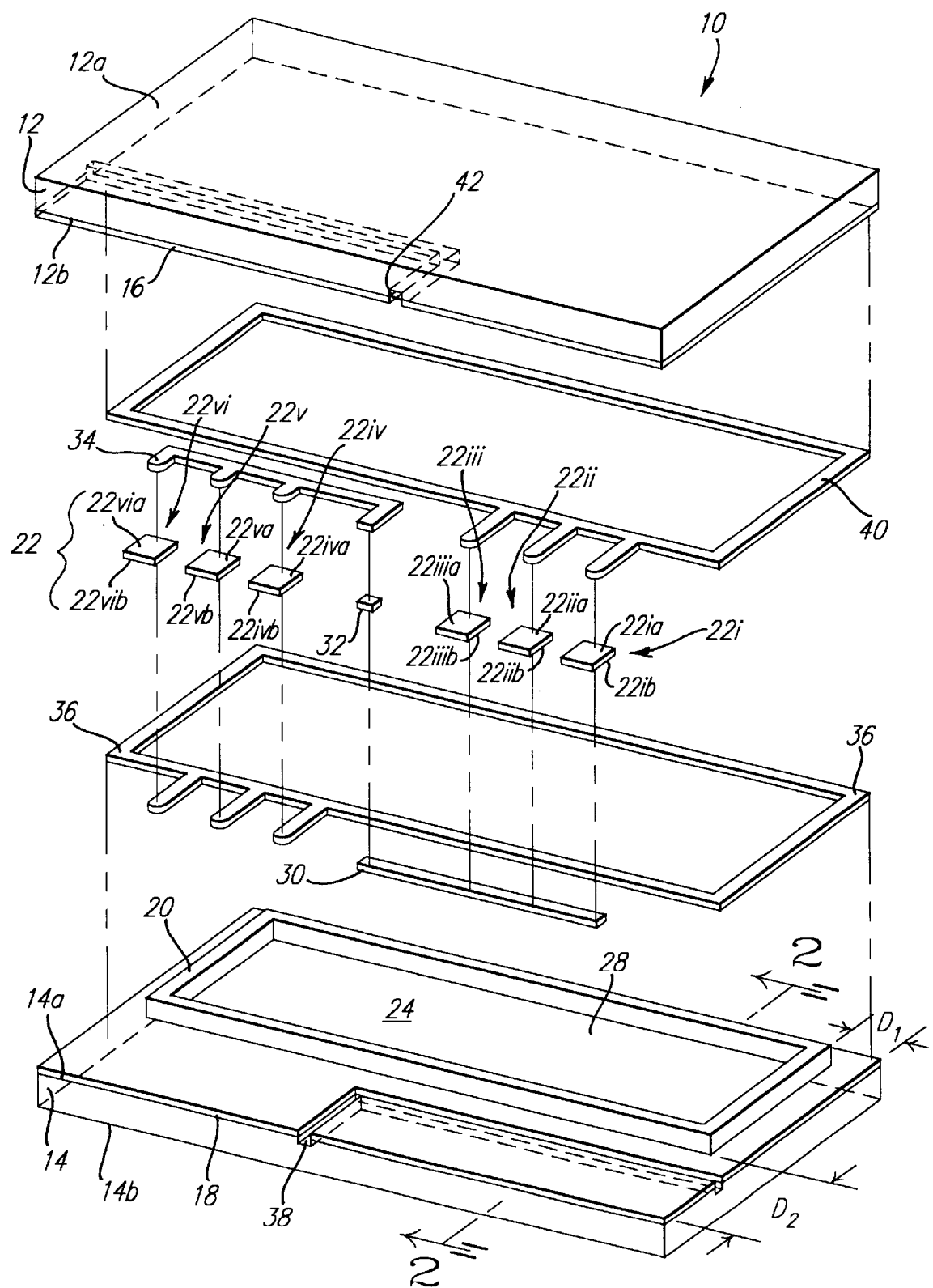
FIG. 1 is an exploded perspective view of a photovoltaic-powered electro-optic device in the configuration of a window embodying the present invention.

FIG. 1 is an exploded perspective view of a photovoltaic-powered electro-optic device 10 having a first transparent element 12 with a front face 12a and a rear face 12b, and a rear element 14 having a front face 14a and a rear face 14b. By electro-optic device we mean variable transmittance light-filters, such as, for example, variable transmittance windows; variable transmittance eyeglasses; variable reflectance mirrors; and display devices which employ such light-filters or mirrors in conveying information. Although the following description discusses, inter alia, electrochromic windows, as one embodiment of the present invention, it will be understood by those skilled in the art that the present invention may be utilized in any of the above-referenced electro-optic devices. Further, since some of the layers of the electro-optic window 10 are very thin, the scale has been distorted for pictorial clarity. Front transparent element 12 and rear transparent element 14 may be any one of a number of materials which are transparent in at least part of the visible region of the electromagnetic spectrum and have sufficient strength to be able to operate in the conditions, e.g., varying temperatures and potential impact from hail and other flying objects such as birds, commonly experienced by a window. For example, elements 12 and 14 may comprise various types of glass, including soda lime float glass, polymers or plastic sheet materials, and the like, with glass being preferred. Elements 12 and 14 may possess UV barrier properties to help protect the electro-optic material 28. The thicknesses of elements 12 and 14 are well known in the art and typically range from about 1 millimeter to about 6 millimeters.

A layer of a transparent electrically conductive material 16 is deposited on the rear face 12b of the first element 12 to act as an electrode, and another layer of a transparent electrically conductive material 18 is deposited on the front face 14a of the second element 14. Both transparent conductive materials 16 and 18 generally cover the entire surface onto which they are deposited, i.e., 12b and 14a, respectively. The layers of transparent conductive materials 16 and 18 may be the same or different and may be any material which adheres well to front element 12 and rear element 14, is resistant to adverse interaction with any materials within the electro-optic window that elements 12 and 14 come into contact, is resistant to adverse interaction with the atmosphere, has minimal diffuse or specular reflectance, high light transmission, and good electrical conductance. Layers of transparent conductive material (16 and 18) may be fluorine doped tin oxide, tin doped indium oxide (ITO), thin metal layers, ITO/metal/ITO (IMI) as disclosed in "Transparent Conductive Multilayer-Systems for FPD Applications", by J. Stollenwerk, B. Ocker, K. H. Kretschmer, 1995 Display Manufacturing Technology Conference Digest of Technical Papers, *SID*, p 111, and the materials described in above-referenced U.S. Pat. No. 5,202, 787, such as TEC 20 or TEC 15, available from Pilkington, Libbey Owens-Ford Co. of Toledo, Ohio. Generally, the conductance of the layers of transparent conductive materials (16 and 18) will depend on their thickness and composition if ITO or fluorine doped tin oxide is used. The thickness of either layer may range from about 500 Å to about 5000 Å, and is preferably from about 1400 Å to about 3500 Å. IMI, on the other hand, may have superior conductivity compared with the other materials, but is generally more difficult and expensive to manufacture and therefore may be useful in applications where high conductance is desirable. The thickness of the various layers in the IMI structure may vary but generally the thickness of the first ITO layer ranges from about 150 Å to about 1000 Å, the metal ranges from about 10 Å to about 250 Å and the second layer of ITO ranges from about 150 Å to about 1000 Å. The metals for the intermediate layer may be silver, gold, and the like. There may be additional layers of metal and ITO if desired, e.g., IMIMI. Also, an optional layer or layers of an anti-iridescent, an antireflection and/or a color suppression material or materials (not shown) may be deposited between transparent conductive material 16 and front glass rear face 12b and/or between transparent conductive material 18 and rear glass front face 14a to suppress or filter out any unwanted portion of the electromagnetic spectrum.

Figure 2:
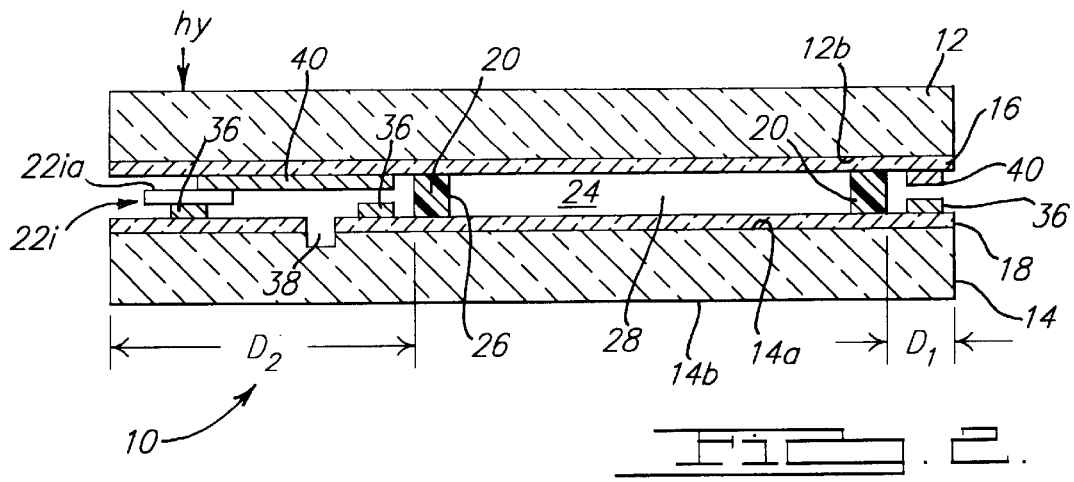
FIG. 2 is a cross-sectional view of the electro-optic device of FIG. 1 taken along the lines 2—2.

As is shown in FIG. 2, front glass element 12 is sealably bonded to rear glass element 14 in a spaced-apart and parallel relationship by a sealably bonding member 20 disposed between and adhered to transparent conductive layers 16 and 18. Sealably bonding member 20 is generally disposed some distance D1 in from the outer perimeter of three edges of both second face 12b and third face 14a and is disposed some distance D2 in from the fourth edge. Sealably bonding member 20 may be any material which is capable of adhesively bonding the layers of transparent conductive material 16 and 18, while, after curing, being capable of maintaining a generally constant distance therebetween. Sealably bonding member 20 should also preferably not be permeable to water or oxygen in any significant degree, and should be generally inert to an electro-optic material 28 disposed in chamber 24 (both of which are described in more detail hereinbelow). Sealably bonding member 20 generally comprises a strip or gasket of a polymeric material, such as rubbers, urethanes, acrylates, epoxies and the like, with epoxies being presently preferred.

Chamber 24, defined by transparent conductive material 16 (disposed on front element 12), transparent conductive material 18 (disposed on back element 14), and an inner circumferential wall 26 of sealing member 20, is filled with an electro-optic medium 28. In this embodiment of the invention the electro-optic medium 28 may be a wide variety of materials capable of changing properties such that light traveling therethrough is attenuated (e.g., liquid crystal, polymer dispersed liquid crystal (PDLC), dipolar suspension, electrophoretic, and electrochromic, etc.). Electro-optic devices incorporating a PDLC medium generally required higher voltages and further require a number of cells placed in series to obtain adequate light attenuation. The presently preferred electro-optic media are electrochromic, which may be further broken down into the subcategories of solution-phase, surface-confined, electrodeposition, or combinations thereof. In this embodiment of the invention the electrochromic media disclosed and claimed in above-referenced U.S. Pat. Nos. 4,902,108; 5,128,799, 5,278,693; 5,280,380; 5,282,077; 5,294,376; 5,336,448, are the presently preferred electrochromic media whether they are in a liquid solution-phase or free-standing gel-type solution-phase. However, in this embodiment of the invention, the most preferred electrochromic media are free-standing gel-type, such as those described in co-pending U.S. Pat. No. 5,679,283, entitled "Electrochromic Layer and Devices Comprising Same" to W. L. Tonar et al., or in co-filed U.S. Pat. No. 5,888,431 entitled "Electrochromic Layer and Devices Comprising Same" filed on or about Mar. 15, 1996 to W. L. Tonar et al all of which are hereby incorporated herein in their entirety by reference. The electrochromic medium 28 is inserted into chamber 24 through a sealable fill port or ports (not shown) through well known techniques such as injection, vacuum backfilling and the like. If a gel is used, it is filled as a liquid and gelled in accordance with the teachings of either of these U.S. Patents.

In accordance with the present invention, at least one discrete photovoltaic assembly 22 is enclosed within (or placed between) the two layers of transparent conductive material (16 and 18) such that the photon absorbing side 22ia–via of each individual photovoltaic cell 22i–vi is facing one direction, i.e., out the front face 12a of front element 12. Although shown in FIG. 1 as two sets of photovoltaic cells, those skilled in the art will realize that photovoltaic assembly 22 may be one or more sets of cells and may even be a single cell. An important aspect of the present invention is placing photovoltaic assembly 22 between the two layers of conductive materials (16 and 18). This allows the glass elements (12 and 14) to protect the assembly 22 from damage and, since the photovoltaic assembly 22 is in direct contact with the transparent conductive materials, the need for any external wiring or circuitry is eliminated. The unexpected benefits of this simple design should not be overlooked. Since no clips or other electrical connection mechanisms are needed to connect the conductive materials to an external circuit there are no concerns with the contact stability between the conductive materials and the clips. Furthermore, no separate housing need be constructed for the photovoltaic cells which simplifies the design and decreases the overall costs of the window 10. Finally, as will become more clear by the discussion hereinbelow, the window embodying the present invention has a cell spacing which uniquely matches commercially available photovoltaic cells. This allows the window design to be simpler in that no wires need to be run to interconnect the photovoltaic cells and the transparent conductive materials (16 and 18).

As those skilled in the art will understand, the design of photovoltaic assembly 22 may vary in the placement of the photovoltaic cells 22i–vi, in the composition of the photovoltaic cells and in the number and arrangement of the electrical connection of the photovoltaic cells. For example, some photovoltaic cells can be produced in sufficient size to allow only two cells electrically connected in series. Furthermore it may be possible to produce a single photovoltaic cell which produces the voltage and current necessary to drive the electrochromic window 10. Finally, the only restriction on the photovoltaic assembly 22 is that it be placed between the two layers of transparent conductive materials (16 and 18). In fact, it is possible to place the assembly 22 in the center of the chamber 24, provided the photovoltaic cells 22i–vi are not shorted by the electrochromic material 28. This may be accomplished by having a seal disposed around the assembly 22 to ensure there is no contact with the electrochromic media 28. In this case, connection to the bus bars (36 and 40) may be made by conductive strips brought into the center of the window 10. Each discrete photovoltaic device in assembly 22 may have a distinct shape and each device may be arranged in such a way that the entire assembly 22 has a particular design such as diamond, circle, or other known or unique configuration. Alternatively, an array of photovoltaic cells may be distributed throughout the window area, with no bus bars, such that each photovoltaic cell produced enough potential to drive a portion of the electrochromic media 28 around it, and the density of the photovoltaic cells are such that the entire electrochromic material 28 is capable of being darkened. Since the cell spacing of the window is comparable to the thickness of a typical photovoltaic cell, the photovoltaic cells may be optionally used to provide and maintain spacing between the glass elements (12 and 14). An electrochromic window made in accordance with the present invention has a cell spacing which ranges from about 100 microns to about 5000 microns and, more typically has a cell spacing from about 300 microns to about 3000 microns.

Photovoltaic devices or solar cells are well known and may comprise a wide variety of p-n junction and Schottky barrier devices comprising materials such as, but not limited to, polycrystalline-, amorphous- and single crystal-structures of silicon, gallium arsenide, gallium phosphide, indium phosphide and indium antimonide, as well as amorphous cadmium sulfide, cadmium selenide, copper indium selenide, copper indium selenide/cadmium sulfide, and the like. The amorphous structures can be made into thin films which can be easily bonded onto a layer of transparent conductive material and, therefore, allow a plurality of photovoltaic cells to be electrically connected in series (discussed in detail hereinbelow). This makes manufacturing of the overall electrochromic window 10 easier and less costly. The presently preferred photovoltaic cells are single crystal and polycrystalline silicon cells.

One important aspect to selecting the size and structure of the photovoltaic assembly 22 is to ensure that the voltage and current output of assembly 22 matches the voltage and current necessary to darken and accurately control the amount of darkening of the electro-optic window 10. The presently preferred electro-optic device is a self-erasing electrochromic window. In such a system the intensity of electromagnetic radiation is modulated or attenuated by passing through electrochromic media 28 which is in contact with transparent conductive materials 16 and 18. Typically the media 28 includes at least one anodic compound and at least one cathodic compound. The anodic compound is electrochemically oxidized and the cathodic compound is electrochemically reduced when a DC electrical potential difference is impressed across the electrochromic media 28. The self-erasing property of the present invention means that, after a potential difference between the electrodes of a device is decreased or eliminated, the transmittance of the solution in the device will increase spontaneously, without need of reversal of the polarity of the electrodes or a bleeder resistor or an external switch, to a value characteristic of the new potential difference. The self-erasing feature is provided by the spontaneous, apparently diffusion-limited, reactions of oxidized anodic compound with reduced cathodic compound to yield anodic compound and cathodic compound in their respective zero-potential equilibrium states. The electrochromic device 10 may be a hybrid between a surface confined electrochromic material on one transparent electrode and a solution phase electrochromic material. In a hybrid system, diffusion from the other transparent electrode to the surface confined electrochromic material provides the self-erasing feature when power is removed or decreased.

This is especially important for a photovoltaic-powered device of the present invention. As the sun rises and begins to impinge on the window (and the photovoltaic device), the photovoltaic device generates a current which travels to the two layers of the transparent conductive materials (16 and 18) and a certain electrical potential (P1) is impressed across (and darkens) the electrochromic media 28. When the potential is sufficient for current to flow through an all solution phase electrochromic media 28, the anodic material is continually being oxidized and the cathodic material is being reduced to replace the anodic and cathodic compounds which diffuse away from the transparent conductive layers and spontaneously react to form non-colored species in the bulk of media 28. As the sun continues to rise, more light hits the window and more power is generated by the photovoltaic assembly 22 and impressed on the window, the electrochromic media 28 darkens further. As the sun begins to set, less light hits the window and less power is generated by the photovoltaic assembly 22 and impressed on the window.

The transmittance of the electrochromic media 28 spontaneously increases to a new level because the number of species being electrochemically colored is less than before. No other system allows for this simple and accurate auto-adjustment without complicated circuitry.

Although this surprising feature has significant advantages, it is important to ensure that the photovoltaic cells are chosen such that the output matches the requirements of the electrochromic window 10. Generally speaking, the photovoltaic cells should make up less than about 10 percent of the total area of the electrochromic window 10, whether placed along the edge or in the center of the window 10. For example, an electrochromic window 10 made with the electrochromic materials disclosed and claimed in U.S. Pat. No. 5,679,283, entitled "Electrochromic Layer and Devices Comprising Same" to W. L. Tonar et al., needs a voltage range of about 0.4 volts to about 1.2 volts and a current range from about 500 microamps per squared centimeter to about 1 microamp per squared centimeter. More typically the current ranges from about 100 microamps per squared centimeter to about 1 microamp per squared centimeter. Photovoltaic devices are well known in the art and their voltage and current output can be adjusted simply by adjusting the size of the device and/or by electrically connecting one or more devices in series. It is possible to have a single photovoltaic device produce from about 0 to about 2.0 volts when exposed to radiant energy ranging from about 0 watts per square centimeter to about 1,000 watts per square centimeter. Therefore, given the window's 10 specified output, simple experimentation will lead one skilled in the art to match the photovoltaic assembly with what is required for the window 10. For example, for a dipolar suspension device operating at 20 volts approximately 30–40 silicon photovoltaic cells could be connected in series to supply the required voltage. For a polymer dispersed liquid crystal device operating at 100 volts approximately 150 to 200 photovoltaic cells in series would be needed.

Photovoltaic assembly 22 is made up of at least one photovoltaic cell if silicon is used with an electrochromic device made in accordance with the teachings of above-referenced U.S. Pat. No. 5,679,283. Assembly 22 is preferably made up of one or more sets of photovoltaic cells electrically connected in series. FIG. 1 shows six photovoltaic cells 22*i* through 22*vi* set up in two sets of three cells, i.e., 22*i–iii* electrically connected together in series with 22*iv–vi*. Thus each set of three cells produces a voltage of approximately 0 to about 0.6 volts depending on the brightness of the sun and, when electrically connected in series, produce a voltage of about 0 to about 1.2 volts. As those skilled in the art will realize, it is possible to combine more sets in series to produce higher voltages. Such a setup allows gray-scale control in that the level of visible light transmittance of electrochromic material 28 in chamber 24 is continuously variable from a transmittance value of typically about 80 percent to a transmittance of typically about 4 percent. This variable transmission is controlled by the amount of light impinging on the photovoltaic assembly 22 and therefore the power output from photovoltaic assembly 22 relative to the power requirements of the window 10 to achieve a given level of darkening. This control of the level of darkening is automatic if the area and efficiency of the photovoltaic assembly 22 is scaled to the area and power requirements of the window 10. However, if desired the transmittance may be more narrow to provide some tint at all times, for example, the range may be from about 50 percent to about 10 percent transmittance. In addition, in some climates it may also be desirable to provide for a covering for the photovoltaic area if there was a desire to prevent the window from darkening. This would be particularly useful in climates which experience large temperature variations. For warm weather conditions, the window could be allowed to darken as a result of the solar illumination. In cold weather, the photovoltaic area might be covered to prevent the window from coloring which will allow maximum sunlight to enter the building to provide light and heat.

Referring specifically to FIG. 1, in operation, light impinges on the top surfaces 22ia–via of cells 22i–vi. The light impinging on cell surfaces 22ia–iiia provides a certain voltage output which depends on the composition and size of the photovoltaic cells 22i–vi, current draw of the window 10 and the intensity of the impinging light. The current path leads out the bottom surfaces 22ib–iiib of photovoltaic cells 22i–iii and travels to the top surfaces 22iva–via of photovoltaic cells 22iv–vi through bus bar 30, via interconnect 32 and bus bar 34. Bus bars 30 and 34 may be made of any material which will ensure that photovoltaic cells 22i–iii are conductivity adhered to the layer of transparent conductive material 18, and cells 22iv–vi are consecutively adhered to the layer of transparent conductive material 16, respectively. The bus bars 30 and 34 may comprise a layer of deposited metal, silver paint, a conductive frit, a spring clip, or a combination thereof. The presently preferred material for bus bars 30 and 34 is 112–15 which is a silver ink made by Creative Materials Inc., in Tynsboro, Mass. Interconnect 32 ensures a current path between the bus bar 30 and bus bar 34 and may be any conductive material, such as a strip or roll of copper, a silver epoxy, or other materials well known in the art for use as conductive interconnects. Assuming cells 22i–iii and 22iv–vi each produce approximately 0.6 volts, then approximately 1.2 volts are applied between the layers of transparent conductive materials (16 and 18) through bus bar 36. Channel 38 extends through transparent material 18 and optionally through a small portion of second glass element 14 such that none of the current transmitted through bus bar 36 to material 18 is allowed to reach cells 22i–iii without passing though electro-optic material 28 in chamber 24. Channel 38 also ensures that the current produced by cells 22i–iii must travel through via interconnect 32, through cells 22iv–vi and bus bar 36 before contacting that portion of material 18 in contact with electrochromic media 28. The potential difference between transparent materials 16 and 18 causes the electro-active species within electrochromic material 28 to be either reduced or oxidized thereby allowing current flow through medium 28. As a result, the window 10 darkens, i.e., attenuates, the light traveling therethrough. Transparent coating 16 is in electrical contact with bus bar 40 which carries the current back to the top surfaces 22ia–iiia of cells 22i–iii to complete the electrical circuit. Channel 42 extends through transparent coating 16 and optionally through a small portion of first glass element 12 such that none of the voltage transmitted through bus bar 40 to cells 22i–iii is allowed to reach cells 22iv–vi without being transmitted though cells 22i–iii. Bus bars 36 and 40 may also comprise a layer of deposited metal, silver paint, a conductive frit, a spring clip, or the presently preferred silver ink. Bus bars 36 and 40 are disposed along the outer periphery of sealing member 20 and, as shown in FIG. 2, are not in electrical contact with one another other than through assembly 22 and electrochromic media 28. Other methods of achieving series/parallel connections of the photovoltaic cell assembly 22 are known in the art, but the above is presently preferred.

Figure 3:
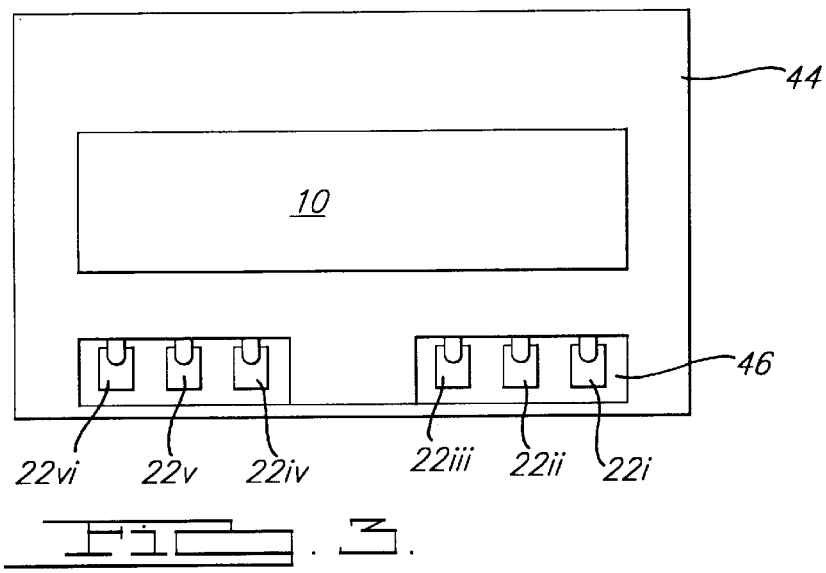
FIG. 3 is a perspective view of the electro-optic device of FIG. 1 in a frame assembly.

Referring to FIG. 3, electro-optic devices in the configuration of windows embodying the present invention may include a frame 44 which extends around the entire periphery of electro-optic window 10. The frame 44 conceals and protects the peripheral edge portions of sealing member 16 and both the front and rear glass elements (12 and 14, respectively). A wide variety of frame designs are well known in the art of window manufacturing. Frame 44 has an opening 46 allowing photovoltaic cells 22i–vi a clear view of the sunlight which is impinging on the window 10.

The following examples are intended to describe certain embodiments of the present invention and should not be interpreted in any manner as limiting the scope of the invention as set forth in the accompanying claims.

EXAMPLE 1

A self-erasing, solution-phase electrochromic window may be produced having an active electrochromic area approximately 25 cm×30 cm with a cell spacing of approximately 890 microns. The window will have concentrations of anodic and cathodic electrochromic materials of about 6 mM each and approximately 5% by volume of polymethylmethacrylate dissolved in propylene carbonate as a solvent. The anodic material is 5,10-dihydro-5,10-dimethylphenazine and the cathodic material is 1,1'-di (phenylpropyl)-4,4'-dipyridinium difluoroborate. Such a window will require approximately 1 volt to reduce the transmission of the window from above 70% to below 10% and 20 mA of current to maintain a steady-state darkened condition.

For two sets of p-n junction silicon photovoltaic devices connected in series, a solar illumination of 500 W/m2 will produce a current output of 2.5 $mA/cm^2$ of photovoltaic cell area at 1.0 volt. A minimum photovoltaic area of 8 cm 2 will be required to produce the 20 mA necessary to darken the electrochromic window in this example.

EXAMPLE 2

Propylene carbonate was added to a reaction flask and deoxygenated with dry nitrogen. 20 weight percent of monomers were added to the reaction flask in the molar ratio of 1 part 2-hydroxyethyl methacrylate (HEMA) to 5 parts methyl methacrylate (MMA). The MMA was purified by through distillation at atmospheric pressure using a short neck distillation column. The HEMA was purified by distillation at approximately 3 mm-Hg using a short neck distillation column. The reaction flask was heated to 70 degrees Celsius and a free radical initiator (V-601{Dimethyl 2,2'-Azobis(2-methylpropionate)}(Dimethyl 2,2'-azobisisobutyrate) was added. When the viscosity of the resulting solution increased noticeably, more propylene carbonate (at reaction temperature) was added to the flask. The reaction was continued until completion with the resulting weight percent of the pre-polymer being 10 percent. The pre-polymer solution was diluted to 5% by weight with propylene carbonate. 30 millimolar of Tinuvin p was added to and dissolved in the pre-polymer solution. 3 millimolar of 1,1'-di(3-phenyl(n-propyl)-4,4'bipyridinium and 3 millimolar 5,10-dihydro-5,10-dimethylphenazine were added to the pre-polymer solution. This solution was degassed by vacuum and flushed with nitrogen. Sufficient toluene diisocyanate crosslinker was added to crosslink approximately 60 percent of the theoretical hydroxyl positions. This solution was thoroughly mixed to ensure that the crosslinker was evenly distributed throughout the fluid.

A part was assembled which was large enough to allow observation of its performance over long periods of time in a use similar to that proposed for an electrochromic window.

Two glass elements coated with a fluorine doped tin oxide transparent conductive coating were cut to the desired size. An epoxy seal material was dispensed on one of the glass elements, then both glass elements were placed on half inch glass vacuum platens. The platens were then held apart with metal spacers and placed in a near vertical position. The platen assembly was then placed in an oven to cure the epoxy. This assembly had the dimensions of about 100 cm by 140 cm, and had an interpane space of about 1.5 millimeters. The solution was introduced into the device.

The electrochromic polymer solution had reached its gel point within 3 days of adding the crosslinking agent. Crosslinking may either be continued at room temperature or may be optionally accelerated by placing the part in a warm oven, e.g., 70 degrees Celsius.

After the electrochromic solution was cured, its function was tested by applying 1.0 volts. Transmission of these parts in the bleached state is 78%. In the fully darkened state the transmission is 5%. The transmission went from 78 to 5 in around 20 minutes and colors from the edges to the center. Brush marks and streaks are apparent especially at transition levels in transmission. The marks and streaks became more apparent over time. The window requires approximately 60 mA to maintain steady-state transmission of the window at about 5% for visible light.

For two sets of p-n junction silicon photovoltaic devices connected in series with a solar illumination of 500 W/m2 with a current output of 2.5 mA/cm2 at 1.0 volts, a minimum photovoltaic area of 24 cm2 would be required to produce the 60 mA necessary to maintain the darkened condition of the electrochromic window in this example.

Liquid crystal devices and some types of electrochromic devices, e.g., solution phase-, gel- and hybrid-types, require uniform spacing between the two glass elements (12 and 14). This uniform spacing is needed to ensure even and uniform darkening as well as to minimize any double imaging problems. Also, as stated above, the cell spacing of the electrochromic window 10 of the present invention are surprisingly matched to the thickness of commercially available photovoltaic cells. Although it is common practice in the electro-optic art, in some instances utilizing the photovoltaic cells, or other objects such as glass beads and the like between the glass elements (usually in the seal), as an internal cell spacer is not the presently preferred method for ensuring uniform cell thickness. The reason for this is that these spacers are either fragile or rigid, both of which have associated manufacturing problems. When the seal material 20 of the present invention cures it shrinks. As the spacing between the glass elements 12 and 14 increases, so does the amount of seal material which must be used to fill seal the space. As the thickness of the seal material 20 increases so does the amount it shrinks during cure. Therefore, if the photovoltaic cells are used by themselves as a spacer element they will be damaged as the glass elements 12 and 14 move toward one another as the seal material 20 shrinks during cure. If glass beads are used, high stress will develop between the beads and the glass elements 12 and 14 as the seal material 20 tries to shrink. When the cell spacing exceed approximately 300 microns, this stress may be high enough to break the glass elements (12 and/or 14). Further, this higher stress in the seal makes the seal less durable to thermal and mechanical stresses experienced when the device is exposed to variable environmental conditions.

One method for reducing this stress is to use a flexible seal material, however, flexible seals have their own operational deficiencies in that they do not have adequate oxygen- and moisture-barrier properties. If oxygen or moisture are able to permeate the seal they can degrade the electrochromic system and cause the window to not function properly. Thus, although rigid seals are preferred due to their barrier properties an improved method is needed to bond the assembly together (prior to filling the chamber 24 with electrochromic medium 28).

Figure 4:
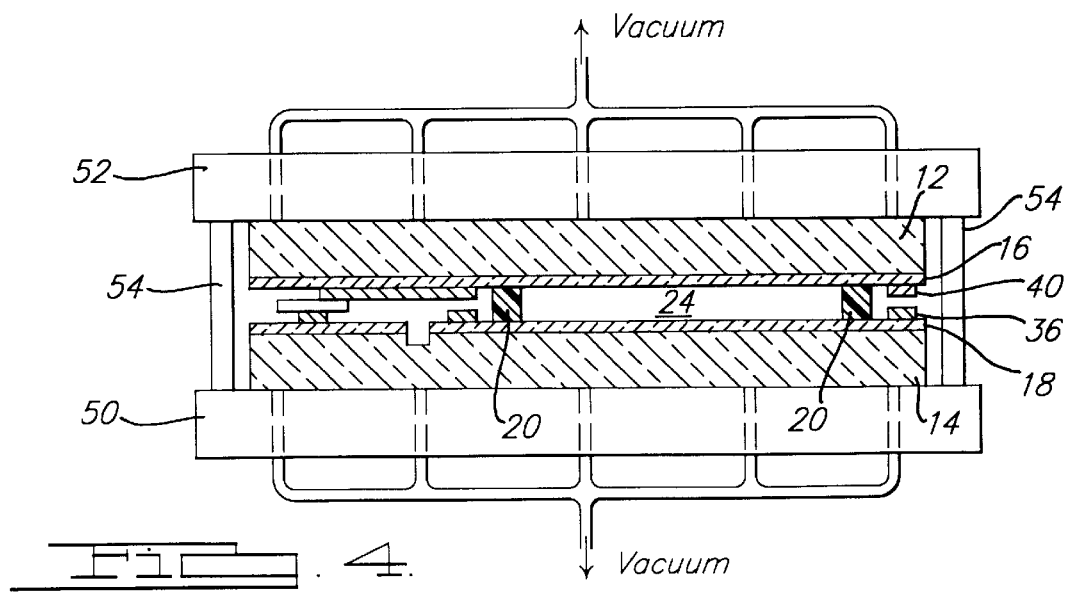
FIG. 4 is a cross-sectional view of an apparatus used in the assembly of an electro-optic device in the con figuration of a window.

In accordance with another embodiment of the present invention, a spacerless electrochromic window 10 is provided, as is the method for producing such a device. A key aspect of this embodiment is ensuring that the glass elements 12 and 14 are held in a spaced-apart and parallel relationship while the seal material 20 cures. The substrates can be held by a variety of methods, including edge clamps, edge clips and vacuum chucking, with a vacuum chucking system being preferred. Typically a near vertical cure is preferred to reduce the amount of sag the substrates experienced as a result of gravitational pull, however, with a vacuum chucking system, since both glass elements are held to a planar vacuum substrate, the glass elements may be bonded in a horizontal orientation. Referring to FIG. 4, two vacuum-applying members 50 and 52 are provided to contact glass elements 12 and 14 on the sides which are most remote from each other (i.e., the sides that do not confront one another) and apply a vacuum to each glass element. The sealably bonding material 20 is disposed along the periphery of one of the transparent conductive coatings, e.g., material 18, and the second glass element (i.e., transparent coating 16) is brought into a spaced-apart and parallel relationship with the first glass element such that the circumferential edges of each glass element are substantially aligned. Finally, sufficient heat or UV light is applied to uniformly and completely cure seal material 20. The vacuum-applying members can be held in the spaced apart relationship by a simple spacer 54 such that, as the seal member 20 cures and contracts, the glass elements 12 and 14 may pull away from the vacuum-applying member and reduce the stress in the seal member 20. In a more complicated system, the two vacuum-applying members 50 and 52 can be held in a spaced-apart and parallel relationships by a hydraulics system (not shown) well known in the art. Optionally, the vacuum-applying members can have embedded heaters, or the entire assembly can be heated with infra-red radiation, a convection heating oven or other methods well known in the art. It is important, however, that the seal member 20 be heated or, when a UV curing epoxy is utilized have radiation applied, in a uniform manner to prevent uneven curing which can produce inconsistencies in the spacing of the substrates.

Figure 5:
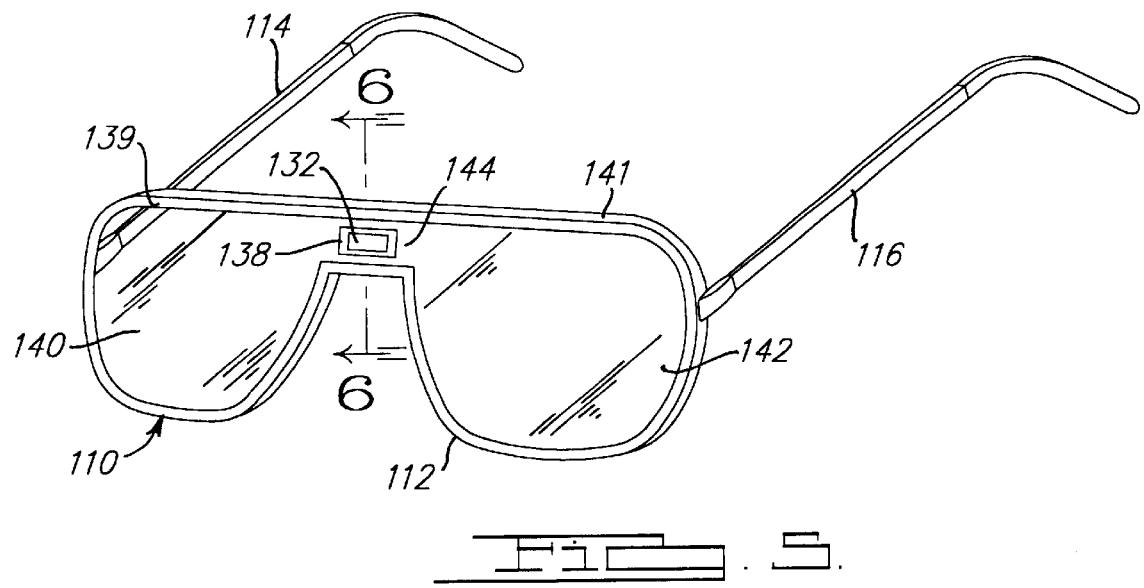
FIG. 5 is a prospective view of an electro-optic device in the configuration of a pair of electrochromic eyeglasses embodying the present invention.
Figure 6:
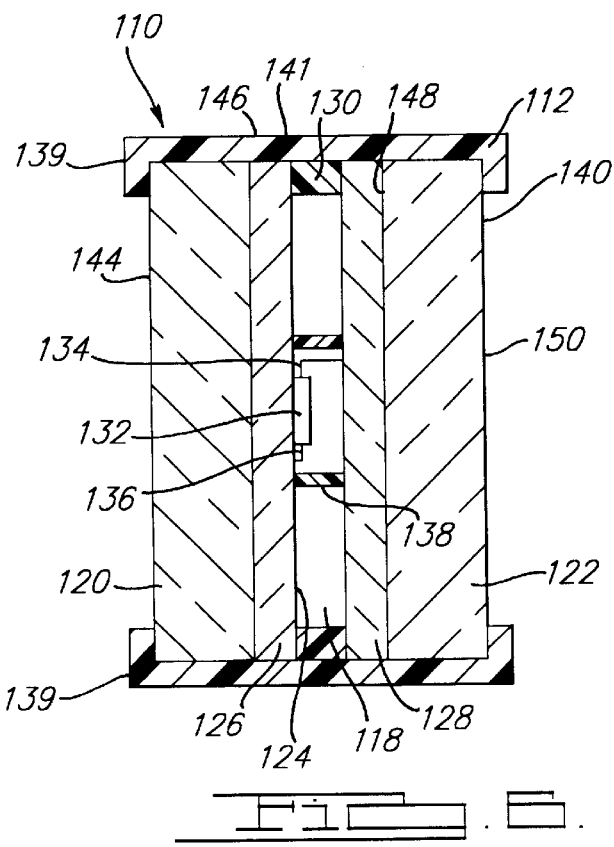
FIG. 6 is a simplified, enlarged cross-sectional view of the eyeglasses illustrated in FIG. 5, taken on the line 6—6 of FIG. 5.

Referring to FIGS. 5 and 6, there is illustrated therein another embodiment of the invention in the configuration of a pair of eyeglasses, generally designated 110, embodying the present invention. In general, in eyeglasses embodying the present invention, the eyeglasses are comprised of a frame 112 and conventional eyeglass temples 114 and 116 pivotally connected to the frame 112 in a conventional manner. The frame 112 carries the optical glass or plastic elements which will be described hereinafter in greater detail. In this embodiment of the invention the eyeglasses 110 include a thin layer 118 of an electrochromic chemical solution disposed between two glass or plastic lens elements 120 and 122. When the electrochromic chemical solution 118 is electrically energized, it darkens and begins to absorb light. The higher the voltage, the darker the eyeglasses become. When the electrical voltage is decreased to zero, the eyeglasses return to their clear state. Given the proximity to the human eye and the high risk of impact/breakage, the use of plastic substrates in any sunglass application is preferred. In addition, the use of aqueous rather than organic solvents in electrochromic sunglasses would be favored from the standpoint of substrate compatibility. Numerous electrochromic materials can be utilized for aqueous-based electrochromic systems, including but not limited to bipyridinium salts (especially the halide, nitrate, and triflate salts), $Fe(aq)^{3+/2+}$, $Eu(aq)^{3+/2+}$, $[Ru(NH_3)_6]^{3+/2+}$, $[Fe(CN)_6]^{3-/4-}$, various water-soluble ferrocene derivatives, and conductive polymers such as polyaniline, polythiophene and their derivatives. Aqueous-based electrochromic media may optionally include additives such as electrolyte salts, UV stabilizers, antioxidants, thickeners, or the like. Examples of suitable additives include ethylene glycol, polyvinyl alcohol, and polystyrenesulfonate. It should be understood, however, that if desired, the electrochromic components of the eyeglasses embodying the present invention may be of the types disclosed in U.S. Pat. No. 4,902,108, issued Feb. 20, 1990, for Single-Compartment, Self-Erasing, Solution-Phase Electrochromic Devices, Solutions for Use Therein, and Uses Thereof, and assigned to the assignee of the present invention.

The pair of eyeglasses 110 embodying the present invention is depicted in simplified cross-section in FIG. 6. Since some of the layers of the eyeglasses are very thin, the scale has been distorted for pictorial clarity. As shown in FIG. 6, the eyeglasses 110 include a sealed chamber 124. The front element 120 has a transparent electrically conductive layer 126 thereon, and the rear element 122 has a transparent electrically conductive layer 128 thereon. The chamber 124 is thus defined by the transparent electrically conductive layer 126, an edge seal 130, and the transparent electrically conductive layer 128. The chemical solution 118 having the desired electrochromic properties fills the chamber 124. A photovoltaic cell 132 is provided which is disposed in the chamber 124, the terminals 134 and 136 of the photovoltaic cell 132 being electrically connected to the conductive layers 126 and 128, respectively. The photovoltaic cell 132 and its terminals 134 and 136 are surrounded by a tubular member 138 which functions to insulate the photovoltaic cell and its terminals from the electrochromic solution in the chamber 124 to prevent short circuiting of the terminals 134 and 136 by the electrochromic solution. Of course, other means of electrically insulating the photovoltaic cell and its terminals from the electrochromic solution may be utilized.

As shown in FIGS. 5 and 6, the front and rear elements 120 and 122 each include a right lens portion 140 and a left lens portion 142 integrally joined by a bridge portion 144 whereby each of the lens elements is in the form of a continuous unitary structure. Also as shown in FIG. 6, the electrical terminals 134 and 136 of the photovoltaic cell 132 are electrically connected to the bridge portion 144 of each of the conductive layers 126 and 128 so that the entire conductive layer 126 is electrically connected to the terminal 136 of the photovoltaic cell 132 while the entire conductive layer 128 on the rear element 122 is electrically connected to the terminal 134 of the photovoltaic cell 132.

The active area of the exposed front face of the photovoltaic cell may be matched with the area of the electrochromic solution, the ratio of the relative area of the photovoltaic cell with respect to the area of the electrochromic solution being set whereby a predetermined light level provides enough electrical power to dim the electrochromic solution to a desired comfortable level.

Light rays enter through the front lens element 120, the transparent electrically conductive layer 126 and the electrochromic layer. 118 before being transmitted through the other conductive layer 128 and the rear lens element 122. Thus, the entering light rays are attenuated in proportion to the degree to which the electrochromic solution 118 is light absorbing. When the electrochromic solution is highly light absorbing, the intensity of the entering light rays reaching the eyes of the wearer is diminished. Thus the basic structural elements of the electrochromic assembly include two electrode-bearing lens elements 120 and 122, a seal 130 which spaces apart and holds the lens elements in substantially parallel relationship in an assembled pair of eyeglasses 110, and which surrounds a chamber 124 which in assembled eyeglasses is defined by the electrode layers 126 and 128 on the electrode-bearing lenses as well as the circumferential inside walls of the spacing and sealing layer 130. The volume of the chamber 124 may be filled with any of the solutions disclosed in U.S. Pat. No. 4,902,108 which have reversibly variable transmittance in the operation of the eyeglasses, the solution in the chamber being in contact with both electrode layers 126 and 128 during operation of the eyeglasses 110.

As illustrated in the drawings, the frame 112 surrounds the electrochromic assembly in a circumferential manner, the frame 112 including flange portions 139 and 140 integrally joined by a web portion 141. The frame 112 conceals the edge portions of the front and rear lens elements and the sealing member 130. The frame 112 thus can extend around the entire circumference of the electrochromic eyeglass assembly. It should be understood that if the seal is pleasing in appearance, it is not necessary to contain it.

Referring in greater detail to the drawings, the photovoltaic powered electrochromic eyeglasses 110 embodying the present invention includes the front transparent lens element 120 having a front face 144 and a rear face 146, and the rear lens element 122 having a front face 148 and a rear face 150. The front transparent lens element 120 and the rear transparent lens element 122 may be formed of any one of a number of materials which are transparent in the visible region of the light spectrum and have sufficient strength to withstand the forces exerted thereon that may vary as a result of varying temperatures and/or impact forces conventionally exerted on eyeglasses. The front and rear lens elements 120 and 122 may be formed of various types of polymers or plastic sheet materials and the like. By way of example, the lens elements may be formed of polyolefins such as Cyclic Olefin Copolymers, like Topas, available from Hoechst of Frankfurt, Germany, or polycarbonate such as CR-39 from PPG of Pittsburgh, Pa., or acrylics such as Lucite from Dow Chemical of Midland, Mich., or polyester such as mylar available from DuPont of Wilmington, Del., or commercially available clear polyvinyl chloride or polystyrene polymer. It will be understood that, if desired, the front and rear elements 120 and 122 may be formed of suitable glass and may possess ultraviolet barrier properties to protect the electrochromic material. The thicknesses of the front and rear lens elements 120 and 122 may typically range from about 1 millimeter to about 6 millimeters.

As previously mentioned, a layer 126 of transparent electrically conductive material is deposited on the rear face 146 of the front lens element 120 to act as an electrode, and another layer 128 of transparent electrically conductive material is deposited on the front face 148 of the rear lens element 122. Both layers of the transparent conductive materials cover the entire surfaces of the right and left lens sections 140 and 142 and the bridge section 144 on which they are deposited. The layers of transparent conductive materials may be the same or different and may be of any material which adheres satisfactorily to the front lens element 120 and the rear lens element 122, is resistant to adverse interaction with any materials within the electrochromic eyeglasses that the front and rear elements may come in contact with, is resistant to adverse interaction with the atmosphere, has minimal diffused or specular reflectance, high light transmission, and good electrical conductance. The layers 126 and 128 of transparent conductive material may be fluorine doped tin oxide, tin doped indium oxide (ITO), thin metal layers, ITO/metal/ITO (IMI), or other transparent conductive materials. The conductive layers may be undercoated with hard coat materials such as $SiO_2$ or other layers that would, for example, retard oxygen or moisture or other gas permeation and enhance adhesion to the plastic such as with thin layers of chromium metal. In general, the conductance of the layers 126 and 128 of transparent conductive materials will depend on their thickness and composition if ITO or fluorine doped tin oxide is used. The thickness of either transparent conductive layer may range from about 50 Å about 5000 Å, it being understood that if it is a transparent metal oxide, thicknesses may range from about 250 Å to 3500 Å. Transparent metal layers are typically thinner from about 10 Å to 300 Å. IMI, on the other hand, may have superior conductivity compared with the other materials, but is generally more difficult and expensive to manufacture and therefore may be useful where high conductance is desirable. The thickness of the various layers in the IMI structure may vary but generally the thickness of the first ITO layer ranges from about 150 Å to about 1000 Å, the metal ranges from about 10 Å to about 250 Å and the second layer of ITO ranges from about 150 Å to about 1000 Å. The metal for the intermediate layer may be silver, gold, rhodium, platinum, aluminum and the like. Also there may be additional layers of metal and ITO if desired, such as IMI. Moreover, an optional layer or layers of an anti-iridescent, and anti-reflection and/or a color suppression material or materials may be deposited between the transparent conductive material 126 and the front lens rear face 146 and/or between the transparent conductive material 128 and the rear lens front face 148 so as to suppress or filter out any unwanted portions of the light spectrum. Also, if desired, conventional anti-scratch material may be applied to the exposed surfaces 144 and 150 of the lens elements or a thin layer of chrome can be added to promote adhesion to the substrate.

As show in FIG. 6, the front lens element is sealably bonded to the rear glass element in a spaced apart and parallel relationship by the bonding seal 130 disposed between and adhered to the transparent conductive layers 126 and 128. The bonding seal 130 is generally disposed around the entire periphery of the front and rear lens elements, and the bonding seal may be formed of any suitable material which is capable of adhesively bonding the layers 126 and 128 of transparent conductive material, while, after adhering, being capable of maintaining a generally constant distance therebetween. The seal 130 should also not be permeable to water or oxygen to any significant degree, and should be generally inert to the electrochromic material disposed in the chamber 124. The seal 130 may comprise a strip or gasket of polymeric material, such as rubber, urethane, acrylate, epoxies and the like.

The chamber 124 defined by the transparent conductive material 126 disposed on the front element 120 and the transparent conductive material 128 disposed on the rear lens element 122, and the inner circumferential wall of the seal 130, is filled with the electrochromic medium 118 previously described. The electrochromic medium is capable of changing properties such that light traveling therethrough is attenuated when voltage is applied to the electrochromic medium. The electrochromic medium 118 may be inserted into the chamber 124 through a sealable fill port through well known techniques such as by injection, vacuum back filling and the like.

In accordance with the present invention, at least one photovoltaic cell 132 is disposed between the two layers of transparent conductive material 126 and 128 such that the photon absorbing side of the photovoltaic cell is facing toward the forward surface 144 of the front lens element 120. In addition, the photovoltaic cell 132 is disposed in the bridge area 144 of the front and rear lens elements between the left and right lens areas 140 and 142 so that the photovoltaic cell terminals 134 and 136 are in electrical contact with the transparent electrically conductive layers 126 and (128 which cover the right and left lens areas 140 and 142 and the bridge area 144 disposed therebetween as previously described. As shown in FIGS. 5 and 6, the photovoltaic assembly is preferably a single cell, although it will be understood that two or more cells may be connected in series if so desired. An important aspect of the present invention resides in placing the photovoltaic cell 132 between the two layers 126 and 128 of the electrically conductive materials which cover the right and left lens areas 140 and 142 and the bridge area 144 therebetween. With such a construction, the front and rear lens elements 120 and 122 protect the photovoltaic assembly, including the photovoltaic cell 132 and its terminals, from damage. Since the photovoltaic cell terminals are in direct contact with the transparent conductive materials, the need for any external wiring or circuitry is eliminated. Moreover, the need for batteries or other sources of electrical potential is also eliminated. Furthermore, electrical connection devices, such as spring clips, are not needed to connect the conductive materials to external circuitry thereby simplifying the design and reducing the cost of the electrochromic eyeglasses. However, if desired the transparent conductive layer could be supplemented by a conductive bus such as a metallic film layer around the perimeter or a wire conductor in the sealing area to help distribute electrical current and aid in uniform coloration or darkening. In the embodiment of the invention illustrated in FIGS. 5 and 6, a single photovoltaic cell is provided which produces the voltage and current necessary to drive the electrochromic material, the photovoltaic assembly being placed between the two layers of transparent electrically conductive material. In order to prevent the photovoltaic cell from being short circuited by the electrochromic material, the tubular member 138 is provided which is disposed around the photovoltaic cell 132 to ensure that there is no direct contact with the electrochromic media. Since the distance between the conductive layers 126 and 128 defining the chamber 124 is greater than the thickness of a typical photovoltaic cell, the photovoltaic cell may be easily accommodated in the chamber 124 in the area of the bridge portion 144 between the right and left lens portions 140 and 142 of the eyeglasses 110.

The photovoltaic cells are well known and may comprise a wide variety of p-n junctions and Schottky barrier devices comprising materials such as, but not limited to, polycrystalline-, amorphous- and single crystal-structures of silicon, gallium arsenide, gallium phosphide, indium phosphide and indium antimonide, as well as amorphous cadmium sulfide, cadmium selenite, copper indium selenite, copper indium selenite/cadmium sulfide, and the like. The amorphous structures may be made into thin films which can be easily bonded onto a layer of transparent conductive material and, therefore, can be easily accommodated within the electrochromic chamber. It is preferred that the photovoltaic cells be single crystal and polychrystalline silicon cells.

An important aspect in the selection of the size and structure of the photovoltaic assembly in this embodiment of the invention is to ensure that the voltage and current output of the photovoltaic assembly match the voltage and current necessary to darken and accurately control the amount of darkening of the electrochromic eyeglasses. In this embodiment of the invention, it is preferred that the electrochromic media be self-erasing. In such a system the intensity of the light is modulated or attenuated by passing through the electrochromic media which is in contact with the transparent electrically conductive materials 126 and 128. Typically the electrochromic media 118 includes at least one anodic compound and at least one cathodic compound. The anodic compound is electrochemically oxidized and the cathodic compound is electrochemically reduced when a DC electrical potential difference is impressed across the electrochromic media. The self-erasing property of the present invention means that, after a potential difference between the electrodes 126 and 128 is decreased or eliminated, the transmittance of the solution 118 in the chamber 124 will increase spontaneously, without the need of reversal of the polarity of the electrodes and without the need of a bleeder resistor or an external switch, to a value characteristic of the new potential difference. The self-erasing feature is provided by the spontaneous, apparently diffusion-limited, reactions of oxidized anodic compounds with reduced cathodic compounds to yield anodic compounds and cathode compounds in their respective zero-potential equilibrium states. It should be understood that with the solution phase electrochromic media, the self-erasing electrochromic solution performs a double function, i.e. performs the function of coloring and also acts as a bleeder resistor which constantly dissipates electrical energy thereby obviating the need for a separate bleeder resistor as used in the above mentioned U.S. Pat. No. 5,377,037.

In photovoltaic powered eyeglasses embodying the present invention, as light impinges on the photovoltaic cell 132, the photovoltaic cell generates an electrical current which travels to the two layers of the transparent conductive materials, and an electrical potential is impressed across and darkens the electrochromic media. When the potential is sufficient for current to flow through the solution-phase electrochromic media, the anodic material is continually being oxidized and the cathodic material is being reduced to replace the anodic and cathodic compounds which diffuse away from the transparent conductive layers and spontaneously react to form non-colored species in the bulk of the electrochromic media. As additional light impinges upon the photovoltaic cell 132, more power is generated by the photovoltaic assembly and impressed on the eyeglasses, and the electrochromic material darkens further. When less light impinges upon the photovoltaic cell and less power is generated by the photovoltaic cell the transmittance of the electrochromic media spontaneously increases to a new level because the number of species being electrochemically colored is less than before. It will be understood that such accurate automatic adjustment is obtained without complicated circuitry. As illustrated in FIGS. 7 and 8 of the drawings, and as will be described hereinafter in greater detail, a mechanical shutter may also be provided to control the amount of light impinging upon the photovoltaic cell, thereby enabling the user to adjust the darkening of the electrochromic material to an individually comfortable level.

It should be understood that the photovoltaic cell 132 is chosen whereby the output matches the requirements of the electrochromic media. Photovoltaic cells are well known in the art and their voltage and electrical current output can be adjusted simply by adjusting the size of the photovoltaic cell and/or by electrically connecting one or more cells in series. It should be understood that a single photovoltaic cell can produce from about 0 to about 2.0 volts when exposed to light energy ranging from about 0 watts per square centimeter to about 1,000 watts per square centimeter. Therefore, given the eyeglasses' specified output, simple experimentation will enable one skilled in the art to match the photovoltaic cell with the requirements for the eyeglasses. It should be understood that the present invention permits gray-scale control in that the level of visible light transmittance of the electrochromic material in the chamber is continuously variable from a transmittance value of approximately 80% to a transmittance value of approximately 4%. This variable transmission is controlled by the amount of light impinging on the photovoltaic assembly and therefore the power output from the photovoltaic assembly relative to the power requirements of the eyeglasses is controlled to achieve a predetermined level of darkening. This control of the level of darkening is automatic if the area and efficiency of the photovoltaic assembly is scaled to the area and power requirements of the eyeglasses. If desired, the transmittance may be adjusted to provide some tint at all times, for example, the range may be from about 50% to about 10% transmittance. In addition, as previously mentioned, it may also be desirable to provide for a mechanical shutter or other covering for the photovoltaic area if there is a desire to adjust the darkening or a desire to prevent the eyeglasses from darkening.

Referring again to the drawings, in operation, light impinges on the forward facing surface of the photovoltaic cell 132. The light impinging on such cell surface provides a certain voltage output which depends on the composition and size of the photovoltaic cell, the current draw of the eyeglasses, and the intensity of the impinging light. The photovoltaic cell is electrically connected to the transparent electrically conductive layers whereby the voltage generated by the photovoltaic cell is applied between the layers of transparent conductive material. The potential difference between the transparent materials causes the electro-active species within the electrochromic material to be either reduced or oxidized thereby allowing current flow through the electrochromic medium. As a result, the eyeglasses darken, i.e., attenuate the light traveling therethrough.

Another embodiment of the invention is illustrated in FIGS. 7 and 8 of the drawings. This embodiment of the invention is comprised of a pair of eyeglasses 210 which include a frame 212 having conventional eyeglass temples 214 and 216 pivotally connected thereto. In this embodiment of the invention, the eyeglasses 210 include the electrochromic chemical solution 118 disposed between the lens elements 120 and 122, as previously described. This embodiment of the invention also includes the photovoltaic cell 132 and the associated terminals 134 and 136 electrically connected to the conductive layers 126 and 128 and electrically insulated by the tubular member 138 from the electrochromic solution as previously described.

As shown in FIGS. 7 and 8, in this embodiment of the invention the front and rear elements 120 and 122 each include a right lens section 140 and a left lens section 142 integrally joined by a bridge section 144 whereby each of the lens elements is in the form of a continuous unitary structure as previously described, the electrical terminals 134 and 136 of the photovoltaic cell being electrically connected to the bridge section 144 of each of the conductive layers 126 and 128 whereby the entire conductive layer 126 is electrically connected to the terminal 136 of the photovoltaic cell 132 while the entire conductive layer 128 on the rear element 122 is electrically connected to the terminal 134 of the photovoltaic cell 132.

As shown in FIGS. 7 and 8 of the drawings, in this embodiment of the invention mechanical shutter means is provided which may be manually adjusted to control the amount of light striking the front face of the photovoltaic cell whereby the degree to which the electrochromic solution 118 is light absorbing may be controlled. Thus, when the front face of the photovoltaic cell 132 is fully exposed, the electrochromic solution will be highly light absorbing and the intensity of the light rays reaching the eyes of the wearer will be diminished. On the other hand, when the front face of the photovoltaic cell 132 is partially or fully blocked by the mechanical shutter means, the electrochromic solution will absorb less light, and the intensity of the light rays reaching the eyes of the wearer will be increased.

As shown in FIGS. 7 and 8, in this embodiment of the invention, the frame 212 is provided with integral spaced angle portions 251 and 253 that define opposed channels 252 and 254 in which the opposite side edge portions of a manually moveable opaque slide 256 are disposed for frictionally inhibited movement up and down as viewed in FIG. 7. The slide 256 includes an opaque flat plate portion 258 the opposite sides of which are disposed in the channels 252 and 254 for sliding movement, and the slide 256 may be provided with a transversely extending ledge 260 to facilitate manual movement of the slide in the channels 252 and 254 by the wearer of the eyeglasses. It should be understood that the slide has a relatively tight fit in the channels 252 and 254 whereby the slide will remain in the selected adjusted position in the channels 252 and 254. It should also be understood that other means, such as conventional detents, may be provided to hold the slide in the desired position within the channels 252 and 254.

In the operation of this embodiment of the invention the amount of light impinging on the forward facing surface of the photovoltaic cell 132 may be manually controlled by the wearer of the eyeglasses. The amount of light impinging on such cell surface determines the output voltage of the photovoltaic cell with the result that the eyeglasses attenuate the light traveling therethrough as a function of the active area of the exposed front face of the photovoltaic cell. Thus the wearer of the eyeglasses may manually adjust the slide 256 to vary the amount of light impinging on the active face of the photovoltaic cell thereby controlling the degree to which the electrochromic solution attenuates the light reaching the eyes of the wearer of the eyeglasses.

While the invention has been described in detail herein in accordance with certain preferred embodiments thereof, many modifications and changes therein may be effected by those skilled in the art. Accordingly, it is our intent to be limited only by the scope of the appending claims and not by way of the details and instrumentalities describing the embodiments shown herein.

What is claimed is:

1. An electro-optic device comprising, in combination, a self-erasing electro-optic variable transmittance component including front and rear spaced transparent elements, each having front and rear faces, said rear face of said front element and said front face of said rear element sealably bonded together in a spaced-apart relationship to define a chamber therebetween, a first layer of transparent electrically conductive material disposed on said rear face of said front element, and a second layer of a transparent electrically conductive material disposed on said front face of said rear element, and said chamber containing a self-erasing electro-optic reversibly variable transmittance medium in contact with said first and second layers of transparent electrically conductive materials, where said variable transmittance component has enclosed therein one or more discrete photovoltaic cells for producing a voltage when exposed to radiant energy and further having means for conveying said voltage from said one or more discrete photovoltaic cells to said variable transmittance component to cause variations in the transmittance of light through said device.

2. The electro-optic device of claim 1, where at least one of said first and second layers of transparent electrically conductive material comprise a material selected from the group consisting essentially of fluorine-doped tin oxide, ITO, a thin layer of metal, a multi-layer construction of ITO/metal/ITO, and combinations thereof.

3. The electro-optic device of claim 2, where at least one of said first and second layers of transparent electrically conductive material has a sheet resistance ranging from about 1.0 ohms per square to about 40 ohms per square.

4. The electro-optic device of claim 2, where said first layer of ITO in said multi-layer transparent electrically conductive material ranges in thickness from about 150 Å to about 1000 Å, and where said layer of metal in said multi-layer transparent electrically conductive material ranges in thickness from about 10 Å to about 150 Å, and where said second layer of ITO in said multi-layer transparent electrically conductive material ranges in thickness from about 150 Å to about 100 Å.

5. The electro-optic device of claim 4, where said metal is selected from the group selected from silver, gold, rhodium, platinum, aluminum, and combinations thereof.

6. The electro-optic device of claim 5, where the sheet resistance of said multi-layer transparent electrically conductive material ranges from about 0.5 ohms per square to about 15 ohms per square.

7. The electro-optic device of claim 1, where said one or more discrete photovoltaic cells is disposed between said first and second transparent elements and along at least one side of an outer perimeter of said chamber.

8. The electro-optic device of claim 7, where said one or more discrete photovoltaic cells produce a voltage ranging from about 0 volts to about 2.0 volts.

9. The electro-optic device of claim 7, where said variable transmittance component has enclosed therein a plurality of discrete photovoltaic cells.

10. The electro-optic device of claim 9, where said plurality of photovoltaic cells includes two sets, each set has at least one photovoltaic cell, and where said two sets of photovoltaic cells are electrically connected in series.

11. The electro-optic device of claim 1, where the electro-optic device is gray-scale controllable over a continuous range of transmittance.

12. An electrochromic device comprising, in combination, a self-erasing variable transmittance component further comprising front and rear spaced transparent elements, each having front and rear faces, said rear face of said front element and said front face of said rear element sealably bonded together in a spaced-apart relationship to define a chamber therebetween, a first layer of transparent electrically conductive material disposed on said rear face of said front element and a second layer of a transparent electrically conductive material disposed on said front face of said rear element, said chamber containing an electrochromic reversible variable transmittance medium in contact with said first and second layers of transparent electrically conductive materials, said variable transmittance component having enclosed therein one or more discrete photovoltaic cells for producing a voltage when exposed to radiant energy, and means for conveying said voltage from said one or more discrete photovoltaic cells to said first and second layers of transparent electrically conductive materials to cause variations in light transmittance of said electrochromic medium.

13. The electrochromic device of claim 12, where said one or more discrete photovoltaic cells is disposed between said first and second transparent elements and along the outer perimeter of said chamber.

14. The electrochromic device of claim 13, where said one or more discrete photovoltaic cells produce a voltage ranging from about 0 volts to about 2.0 volts.

15. The electrochromic device of claim 12 where said means for conveying said voltage includes a first strip, disposed along the outer periphery of said chamber, of an electrically conductive material connecting the bottom of said one or more discrete photovoltaic cells to said layer of transparent conductive material disposed on said front face of said rear transparent element.

16. The electrochromic device of claim 12, where said variable transmittance component has enclosed therein a plurality of discrete photovoltaic cells.

17. The electrochromic device of claim 16, where said plurality of photovoltaic cells includes two sets, each set has at least one photovoltaic cell, and where said two sets of photovoltaic cells are electrically connected in series.

18. The electrochromic device of claim 12, where said one or more photovoltaic cells includes a first set and a second set of photovoltaic cells that are electrically connected in series and where means for conveying said voltage includes, a first strip, disposed along the outer periphery of said chamber, of an electrically conductive material connects the bottom of the second photovoltaic set to said layer of transparent conductive material disposed on said front face of said rear transparent element, a first channel extends around the first photovoltaic set and extends through said layer of transparent conductive material disposed on said front face of said rear transparent element, a second strip, disposed along the outer periphery of said chamber, of an electrically conductive material connects the top of the first photovoltaic set to said layer of transparent conductive material disposed on said rear face of said front transparent element, a second channel extends around said second photovoltaic set and extends through said layer of transparent conductive material disposed on said rear face of said front transparent element, and interconnecting means for electrically connecting a voltage output side of said first photovoltaic set to a voltage input side of said second photovoltaic set.

19. An electrochromic device comprising, in combination, a self-erasing variable transmittance component further comprising front and rear spaced transparent elements, each having front and rear faces, said rear face of said front element and said front face of said rear element defining a chamber therebetween, a first layer of transparent electrically conductive material disposed on said rear face of said front element and a second layer of a transparent electrically conductive material disposed on said front face of said rear element, said chamber containing an aqueous-based electrochromic reversible variable transmittance medium in contact with said first and second layers of transparent electrically conductive materials, said variable transmittance component having enclosed therein one or more discrete photovoltaic cells for producing a voltage when exposed to radiant energy, and means for conveying said voltage from said one or more discrete photovoltaic cells to said first and second layers of transparent electrically conductive materials to cause variations in light transmittance of said aqueous-based electrochromic medium.

20. The electrochromic device of claim 19 wherein said aqueous-based electrochromic medium includes electrochromic materials comprising bipyridinium salts.

21. The electrochromic device of claim 20 wherein said aqueous based electrochromic medium includes electrochromic materials selected from the group consisting of $Fe(aq)^{3+/2+}$, $Eu(aq)^{3+/2+}$, $[Ru(NH_3)_6]^{3+/2+}$, $[Fe(CN)_6]^{3-/4-}$, water-soluble ferrocene derivatives and conductive polymers including polyaniline, polythiophene and derivatives thereof.

22. The electrochromic device of claim 20 wherein said aqueous-based electrochromic medium includes one or more additives selected from the group consisting of electrolyte salts, UV stabilizers, antioxidants, thickeners, ethylene glycol, polyvinyl alcohol and polystyrenesulfonate.

23. An electro-optically dimming device in the configuration of a pair of eyeglasses and comprising, in combination, front and rear spaced lens elements, said front lens element and said rear lens element being transparent, one side of said front lens element confronting said rear lens element including transparent electrically conductive means, one side of said rear lens element confronting said front lens element including transparent electrically conductive means, said transparent electrically conductive means on said front and rear lens elements partially defining a single chamber, said chamber containing a self-erasing electro-optic reversibly variable transmittance medium in contact with said transparent electrically conductive means on said front and rear elements, a photovoltaic cell disposed in said chamber, said photovoltaic cell being electrically insulated from said electro-optic medium and being electrically connected to said transparent electrically conductive means on said front and rear lens elements whereby light impinging on said photovoltaic cell applies an electrical potential to said electro-optic medium throughout said chamber to cause variations in the light transmittance of said electro-optic medium.

24. The combination as set forth in claim 23, said front and rear lens elements each including right hand and left hand lens sections electrically connected by a bridge section, said photovoltaic cell being disposed in said single chamber in alignment with said bridge section whereby voltage generated by said photovoltaic cell is applied uniformly to said right hand and left hand lens sections of said transparent electrically conductive means through said bridge sections of said electrically conductive means, and means for adjustably varying the amount of light impinging on said photovoltaic cell.

25. The combination as set forth in claim 24, wherein said electro-optic medium is gray-scale controllable over a continuous range of light transmittance.

26. An electro-optic device in the configuration of a pair of variable light transmittance eyeglasses and comprising, in combination, front and rear spaced lens elements, said front lens element and said rear lens element each including right hand and left hand lens sections integrally joined by a bridge section, said front lens element and said rear lens element each being transparent, one side of said front lens element confronting said rear lens element including transparent electrically conductive means, one side of said rear lens element confronting said front lens element including transparent electrically conductive means, said transparent electrically conductive means on said front and rear lens elements partially defining a single chamber, said chamber containing an aqueous-based electrochromic reversibly variable transmittance medium in contact with said transparent electrically conductive means on said front lens element and said rear lens element, a photovoltaic cell disposed in said chamber and visible through said bridge section of said front lens element, means electrically connecting said photovoltaic cell to said transparent electrically conductive means on said lens front element and said transparent electrically conductive means on said rear lens element, means electrically insulating said photovoltaic cell from said electrochromic medium except through said transparent electrically conductive means, said photovoltaic cell being effective to apply electrical potential to said electrochromic medium through said transparent electrically conductive means on said front and rear lens elements to cause variations in the light transmittance of said electrochromic medium, and frictionally inhibited shutter means for manually varying the amount of light impinging on said photovoltaic cell.

27. The combination as set forth in claim 26 wherein said electrochromic medium is gray-scale controllable over a continuous range of light transmittance.

28. The electrochromic device of claim 26 wherein said aqueous-based electrochromic medium includes electrochromic materials comprising bipyridinium salts.

29. The electrochromic device of claim 26 wherein said aqueous based electrochromic medium includes electrochromic materials selected from the group consisting of $Fe(aq)^{3+/2+}$, $Eu(aq)^{3+/2+}$, $[Ru(NH_3)_6]^{3+/2+}$, $[Fe(CN)_6]^{3-/4-}$, water-soluble ferrocene derivatives and conductive polymers including polyaniline, polythiophene and derivatives thereof.

30. The electrochromic device of claim 26 wherein said aqueous-based electrochromic medium includes one or more additives selected from the group consisting of electrolyte salts, UV stabilizers, antioxidants, thickeners, ethylene glycol, polyvinyl alcohol and polystyrenesulfonate.

31. An apparatus for assembling an electro-optic device, said apparatus comprising, in combination, a first member having means for securing a first transparent element, a second member having means for securing a second transparent element, and means for holding said first and said second members in a spaced-apart and parallel relationship.

32. The apparatus of claim 31 wherein said first member means and said second member means may be selected from the group consisting essentially of: edge clamps, edge clips and vacuum checking.

33. The apparatus of claim 31 wherein said means for holding said first and said second members in a spaced-apart relationship may be selected from the group consisting essentially of spacers and hydraulic means.

34. The apparatus of claim 31 wherein said first member means and said second member means are vacuum applying members and wherein said means for holding said first and said second members in a spaced-apart relationship are spacers.

35. A method for making an electro-optic device comprising the steps of placing a first transparent element having a first transparent conductive layer on one face thereof onto a first means for securing said transparent element, where said first means secures a face of said first transparent element that is free of said first conductive layer, placing a second transparent element having a second transparent conductive layer on one face thereof, onto a second means for securing said transparent element, where said second means secures a face of said second transparent element that is free of said second conductive layer, disposing a sealing member along the periphery of the transparent conductive layer of one of said first or second elements, and holding said first transparent element and said second transparent element in a spaced-apart and parallel relationship where the sides of said first transparent element and said second transparent element having said transparent layers thereon confront one another until said sealing material cures.

36. The method of claim 35 where said first and said second securing means are vacuum chucking.

37. The method of claim 35 where said sealing material is a strip or gasket of a material selected from the group consisting essentially of rubbers, urethanes, acrylates, and epoxies.

38. The method of claim 35 and further including the step of filling the space between the spaced-apart, parallel transparent elements with a solution containing at least one electrochromic material after said sealing material has cured.

39. A method for making an electro-optic device comprising the steps of placing a first transparent element onto a first means for securing said first transparent element, where said first means contacts only one face of said first transparent element, placing a second transparent element onto a second means for securing said second transparent element, where said second means contacts only one face of said second transparent element, disposing a sealing material along the periphery of one of said first and second transparent elements, and utilizing holding means to hold said first and second means for securing in a spaced-apart and parallel relationship and thereby hold said first and second transparent elements in a spaced-apart and parallel relationship until said sealing material has cured.

40. The method of claim 39 and further including the step of filling the space between said transparent elements and bounded by said sealing material with a solution containing at least one electrochromic material after said sealing material has cured.

41. The method of claim 39 and further including the step of providing first and second transparent elements with a transparent conductive layer on one surface thereof and positioning said transparent elements such that said transparent conductive layers are on opposing surfaces of said transparent elements.

42. A method for manufacturing an electro-optic device comprising the steps of placing a first transparent element onto a first vacuum platen for securing said first transparent element, where said first vacuum platen contacts only one face of said first transparent element, placing a second transparent element onto a second vacuum platen for securing said second transparent element, where said second vacuum platen contacts only one face of said second transparent element, utilizing said first and second vacuum platens to hold said first and second transparent elements in a spaced-apart and parallel relationship during at least a portion of the manufacturing process.

43. The method of claim 42 and further including the step of disposing a sealing material along the periphery of one of said first and second transparent elements, and utilizing said first and second vacuum platens to hold said first and second transparent elements in a spaced-apart and parallel relationship until said sealing material has cured.

44. The method of claim 43 and further including the step of filling the space between said transparent elements and bounded by said sealing material with a solution containing at least one electro-optic material after said sealing material has cured.

* * * * *